United States Patent
Kervec et al.

(10) Patent No.: US 9,912,839 B2
(45) Date of Patent: Mar. 6, 2018

(54) METHOD FOR CONVERSION OF A SATURATED IMAGE INTO A NON-SATURATED IMAGE

(71) Applicant: THOMSON LICENSING, Issy les Moulineaux (FR)

(72) Inventors: Jonathan Kervec, Paimpont (FR); Mekides Assefa Abebe, Rennes (FR); Tania Foteini Pouli, Chateaugiron (FR); Jurgen Stauder, Montreuil/Ille (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 15/115,669

(22) PCT Filed: Jan. 21, 2015

(86) PCT No.: PCT/EP2015/051168
§ 371 (c)(1),
(2) Date: Jul. 30, 2016

(87) PCT Pub. No.: WO2015/113881
PCT Pub. Date: Aug. 6, 2015

(65) Prior Publication Data
US 2016/0352975 A1 Dec. 1, 2016

(30) Foreign Application Priority Data
Jan. 31, 2014 (EP) .................................. 14305142

(51) Int. Cl.
*G06K 9/34* (2006.01)
*H04N 1/60* (2006.01)
*G09G 5/02* (2006.01)

(52) U.S. Cl.
CPC .......... *H04N 1/6027* (2013.01); *G09G 5/026* (2013.01); *G06T 2207/10024* (2013.01); *G09G 2320/0271* (2013.01); *G09G 2340/06* (2013.01)

(58) Field of Classification Search
CPC .......... G06T 2207/20208; G06T 5/001; G06T 5/007; H04N 9/646; H04N 5/2355; G06K 9/4652; G06K 9/00234; G06K 7/1473
See application file for complete search history.

(56) References Cited

U.S. PATENT DOCUMENTS 3,971,065 A 7/1976 Bayer
8,861,851 B2 * 10/2014 Heidrich ................ G06T 5/005
348/609

(Continued)

FOREIGN PATENT DOCUMENTS

EP 2367360 9/2011

OTHER PUBLICATIONS

Elboher et al., "Recovering Color and Details of Clipped Image Regions", 2010 International Conference on Computer Graphics, Visualization, Computer Vision and Image Processing, Freiburg, Germany, Jul. 27, 2010, pp. 1-9.

(Continued)

*Primary Examiner* — Eueng-Nan Yeh
(74) *Attorney, Agent, or Firm* — Jack Schwartz & Associates, PLLC (57) ABSTRACT

The method comprises segmenting lines into regions of saturated pixels, and, for each of these saturated regions, selecting at least one color channel that is not saturated, then, for each pixel of said region, adding to the color information provided by the saturated color channel for said pixel a difference between the color information provided by the (Continued)

selected non-saturated color channel for said pixel and a baseline color value computed for the region of this pixel.

7 Claims, 5 Drawing Sheets

(56) References Cited

U.S. PATENT DOCUMENTS

| | | |
|---|---|---|
| 2008/0055616 A1 | 3/2008 | Scott et al. |
| 2012/0314971 A1 | 12/2012 | Yuan et al. |
| 2013/0321679 A1* | 12/2013 | Lim ................... H04N 5/23229 348/256 |

OTHER PUBLICATIONS

Zhang et al., "Estimation of saturated pixel values in digital color imaging", Journal of the Optical Society of America, vol. 21, No. 12, Dec. 2004, pp. 2301-2310.
Xu et al., "Correction of Clipped Pixels in Color Images", IEEE Transactions on Visualization and Computer Graphics, vol. 17, No. 3, Mar. 2011, pp. 333-344.
Wang et al., "High Dynamic Range Image Hallucination", 18th Eurographics Symposium on Rendering, Grenoble, France, Jun. 25, 2007, pp. 321-326.
Rouf et al., "Gradient Domain Color Restoration of Clipped Highlights", 2012 IEEE Computer Society Conference on Computer Vision and Pattern Recognition Workshops (CVPRW), Providence, Rhode Island, USA, Jun. 16, 2012, pp. 7-14.
Rempel et al., "Ldr2Hdr: On-the-fly Reverse Tone Mapping of Legacy Video and Photographs", SIGGRAPH 2007 Special Interest Group on Computer Graphics and Interactive Techniques Conference, San Diego, California, USA, Aug. 5, 2007, pp. 1-6.
Masia et al., "Evaluation of Reverse Tone Mapping Through Varying Exposure Conditions", ACM SIGGRAPH Asia 2009, Yokohama, Japan, Dec. 16, 2009, pp. 1-8.
Guo et al., "Correcting Over-Exposure in Photographs", 2010 IEEE Conference on Computer Vision and Pattern Recognition, San Franscisco, California, USA, Jun. 13, 2010, pp. 515-521.
Didyk et al., "Enhancement of Bright Video Features for HDR Displays", Eurographics Symposium on Rendering, Graphics Forum, Sarajevo, Bosnia and Herzegovina, Jun. 23, 2008, pp. 1265-1274.
Hasinoff, W., "Saturation (imaging)", Encyclopedia of Computer Vision, Springer, New York, 2014, pp. 699-701, (published before this application Jul. 2016).
Abel et al., "Restoring a Clipped Signal", International Conference on Acoustics, Speech, and Signal Processing, Toronto, Canada, Apr. 14, 1991, pp. 1745-1748.
Wetzstein et al., "Sensor saturation in Fourier multiplexed imaging", 2010 IEEE Conference on Computer Vision and Pattern Recognition (CVPR), San Francisco, California, USA, Jun. 13, 2010, pp. 1-12.
Reinhard et al., "Colour Spaces for Colour Transfer", IAPR Third International Workshop on Computational Color Imaging, Milan, Italy, Apr. 20, 2011, pp. 1-15.
Shen et al., "Over-exposure image correction with automatic texture synthesis", 4th International Congress on Imagine and Signal Processing (CISP), Shanghai, China, Oct. 15, 2011, pp. 1-8.
Masood et al., "Automatic Correction of Saturated Regions in Photographs using Cross-Channel Correlation", Pacific Graphics, vol. 28, No. 7, Oct. 2009, pp. 1861-1869.
Banterle et al., "Inverse Tone Mapping", 4th International Conference on Computer Graphics and Interactive Techniques in Australasia and Southeast Asia, Kuala Lumpur, Malaysia, Nov. 29, 2006, pp. 349-356.
Fu et al., "Correcting Saturated Pixels in Images", Proceedings of SPIE 8299, Digital Photography VIII, Jan. 2012, pp. 1-11.
Kovaleski et al., "High-quality brightness enhancement functions for real-time reverse tone mapping", Visual Computer, vol. 25, No. 5, May 2009, pp. 539-547.

* cited by examiner

METHOD FOR CONVERSION OF A SATURATED IMAGE INTO A NON-SATURATED IMAGE

This application claims the benefit, under 35 U.S.C. § 365 of International Application of PCT/EP15/051168, filed Jan. 21, 2015, which was published in accordance with PCT Article 21(2) on Aug. 6, 2015, in English, and which claims the benefit of European patent application No. 14305142.3, filed Jan. 31, 2014.

TECHNICAL FIELD

The invention relates to the reconstruction of saturated regions of an image on the basis of color information coming from non-saturated color channels of these regions.

BACKGROUND ART

Most existing cameras can only capture a limited range of illumination within a single exposure. Wrong selection of camera settings, combined with the physical constraints of camera sensors limit the maximum irradiance value which can be captured and stored as images for a given exposure time and amplifier gain. Therefore, scene irradiance values, which are beyond the maximum capacity of the camera sensor elements, cannot be accurately captured, resulting in over-exposed or color-saturated regions in the captured images.

Saturation of bright image regions of an image is of course undesirable as it visually degrades the image. Missing detail in bright image regions is particularly problematic in the context of high dynamic range (HDR) imaging, and in particular in reverse tone mapping. Recent developments in display capabilities suggest that consumer displays are likely to display HDR content in the near future, requiring solutions for preparing legacy content for this new display modality. As most current reverse tone mapping solutions detect and expand bright regions in the image, it is crucial that missing color information in these regions is recovered in a robust manner.

Image color saturation can take two forms, which are typically treated using significantly different methods. If all three color channels of colors of saturated parts of an image are clipped due to saturation, no robust color information is present in that part of the image and therefore correction methods either rely on probabilistic information obtained from the rest of the image to hallucinate the missing pixels or on filling in the missing information based on a global prior part of this image. On the other hand, if only one or two of the RGB components are saturated in a part of the image, it is possible to reconstruct missing information in clipped color channels using the color information in non-clipped channels or by combining it with information from nearby image regions. The invention concerns this second form of image color saturation.

Because of the strong correlation between color channels specifically in the RGB color space (see E. Reinhard and T. Pouli, "Colour spaces for colour transfer," in IAPR Computational Color Imaging Workshop, ser. Lecture Notes in Computer Science, R. Schettini, S. Tominaga, and A. Tremeau, Eds. Springer Berlin Heidelberg, 2011—invited paper, vol. 6626, pp. 1-15), most methods related to the second form above process images in the RGB color space. In the simplest case, the global correlation between color channels can be determined in the form of a global Bayesian model and used in the process of recovery of the missing color information due to saturation (see X. Zhang and D. H. Brainard, "Estimation of saturated pixel values in digital color imaging," JOSA A, vol. 21, no. 12, pp. 2301-2310, 2004).

Correlation between color channels can be exploited by using information in unclipped color channels within the same spatial region. In S. Z. Masood, J. Zhu, and M. F. Tappen, "Automatic correction of saturated regions in photographs using cross-channel correlation", Computer Graphics Forum, vol. 28, no. 7. Wiley Online Library, 2009, pp. 1861-1869, the Bayesian modelling method of Zhang et al. (see above) is extended and used the relationship between pixels and their neighbourhood to estimate ratios between RGB channels.

This approach relies on the minimization of two cost functions, which significantly increases its computational complexity. In addition, the use of neighbourhood information may result in incorrect hue values.

An object of the invention is to avoid the aforementioned drawbacks.

SUMMARY OF INVENTION

The method of conversion of a saturated image into a non-saturated image also relies on the correlation between color channels but opts for simple statistics in order to recover clipped color information and to enforce spatial consistency of colors across different lines of the image.

Additionally, in contrast to previous methods, this method is designed to operate on line profiles of the images, making it well suited for hardware applications and display-side processing.

This method relies on the fact that in over-exposed image areas, the RGB components tend to not clip at the same spatial position. Based on the assumption that the color channels are spatially, strongly correlated, this method reconstructs the over-exposed areas of one color channel by considering the variation within unclipped color channel(s) at the same spatial positions.

A subject of the invention is a method of conversion of a saturated image into a non-saturated image comprising:

segmenting said saturated image in regions of pixels the colors of which have at least one color channel in a linear RGB color space which is saturated, and, for each of these saturated regions, among the different color channels providing color information in said linear RGB color space for the pixels of said region, selecting at least one color channel that is not saturated over said region, for each pixel of said region, replacing the color information of said pixel that is provided by the at least one saturated color channel of said region by a reconstructed non-saturated color information, wherein said reconstructed non-saturated color information is the sum of the color information provided by said at least one saturated color channel of said region for said pixel and of the difference between the color information provided by the selected at least one non-saturated color channel for said pixel and a baseline color value computed for the region of said pixel, thus providing said converted non-saturated image.

Preferably, the baseline color value of a region is computed as the minimum color value provided by the reference color channel of this region over at least all pixels in this region. Other pixels may be considered to compute this minimum color value, notably pixels surrounding this region.

Note than in paragraphs 63, 66 and 69 and in FIG. 8 of EP2367360, the reconstructed non-saturated color information of a saturated pixel is a sum of the color information provided by a non-saturated color channel for said pixel and a difference (instead of the saturated color channel as in the invention). In the invention, it is assumed that the color information provided in each color channel is correct up to a clipping or saturation threshold. If the color channel G is clipped at a value $G_{max}$ for pixels of a region, the invention considers that the correct G value for those pixels if there was no saturation would be $G_{max}$+some increment, this increment being not captured due to saturation/clipping. In EP2367360, the corrected G value is not $G_{max}$+some increment, but B value+some increment or R value+some increment. In EP2367360, the maximum corrected G value would be not higher than $G_{max}$, as, in the invention, the correct G value is always above $G_{max}$ and is therefore closer to the real scene values. It means that the invention is particularly well suited for dynamic expansions of range, i.e. for conversion of LDR images into HDR images.

Preferably, said segmenting is performed line by line, one line with saturated pixels after the other, and wherein said regions are segments of lines. Preferably, said baseline color value of a segment is computed as the minimum color value provided by the reference color channel of this segment over all pixels in this segment and over pixels adjacent to this segment in the neighbouring lines the hues of which are closer than a proximity threshold to a representative average hue of this segment. Preferably, said reconstructed color information replacing the color information of a pixel that is provided by said at least one saturated color channel is computed by using also color statistics based on color information related to other pixels belonging to the same line of the segment of said pixel and/or to neighboring lines. Preferably, these neighboring lines are adjacent one to another.

A subject of the invention is also a method of conversion of a saturated image into a non-saturated image, the color information of each pixel of said saturated image being provided through three different color channels such as to express this color information into an RGB color space, said method comprising the steps of:

segmenting lines of adjacent pixels of said saturated image into segments of adjacent pixels the colors of which have at least one color channel which is saturated, and, for each of these saturated segments, over the different color channels providing color information in said linear RGB color space for the pixels of said segment, selecting at least one color channel that is not saturated over said segment, for each pixel of said segment, replacing the color information of said pixel that is provided by the at least one saturated color channel of said segment by a reconstructed color information computed by using at least the color information provided for the same pixel by the selected at least one not-saturated color channel of said segment, thus providing said converted non-saturated image.

Preferably, said reconstructed non-saturated color information of a pixel of a segment is computed by adding the color information of said pixel that is provided by the at least one saturated color channel of said segment and the difference between the color information provided for said pixel by the selected at least one non-saturated color channel of said segment and a baseline color value computed for said segment.

Preferably, said baseline color value of a segment is computed as the minimum color value provided by the reference color channel of this segment over all pixels in this segment and over pixels adjacent to this segment in the neighbouring lines the hues of which are closer than a proximity threshold to a representative average hue of this segment. Preferably, neighboring lines are adjacent one to another.

Preferably, said method is implemented line by line, one line with saturated pixels after the other.

In summary, the method according to the invention comprises segmenting lines into regions of saturated pixels, and, for each of these saturated regions, selecting at least one color channel that is not saturated, then, for each pixel of said region, adding to the color information provided by the saturated color channel for said pixel a difference between the color information provided by the selected non-saturated color channel for said pixel and a baseline color value computed for the region of this pixel.

A subject of the invention is also an image conversion device for the conversion of a saturated image into a de-saturated image, comprising:

a first module configured to segment an image in regions of pixels the colors of which have at least one color channel in a linear RGB color space which is color saturated, and a second module configured to desaturate pixels of each saturated region provided by the first module by selecting at least one color channel that is not saturated over said pixels of said region and, for each of those pixels, by replacing the color information of said pixel that is provided by the at least one saturated color channel of said region by the sum of the color information provided by said at least one saturated color channel of said region for said pixel and of the difference between the color information provided by the selected at least one non-saturated color channel for said pixel and a baseline color value computed for the region of said pixel.

Preferably, said first module is configured to segment each line of said image in regions that are segments of said line.

A subject of the invention is also an electronic device comprising the image conversion device according to the invention. Preferably, this electronic device is a TV set, a cell phone, a tablet, a set-top-box, a gateway, or a camera.

BRIEF DESCRIPTION OF DRAWINGS

The invention will be more clearly understood on reading the description which follows, given by way of non-limiting example and with reference to the appended figures in which.

DESCRIPTION OF EMBODIMENTS

The different steps of two non-limiting embodiment of the method according to the invention will now be described in reference to FIG. 1. These different steps may be provided through the use of dedicated hardware as well as hardware capable of executing software in association with appropriate software, forming together an image conversion device. The hardware may notably include, without limitation, digital signal processor ("DSP") hardware, read-only memory ("ROM") for storing software, random access memory ("RAM"), and non-volatile storage. The image conversion device can be part of an electronic consumer device as, for instance, a TV set, a cell phone, a tablet, a set-top-box, a gateway, or a camera.

An input 8-bit RGB saturated image, denoted I, of size M×N pixels, color coded under R,G,B color channels, is provided to the image conversion device. If this image conversion device is part of a cell phone, a tablet or a camera, this image may be directly provided through the capture of an image. In such a situation, the linear RGB color space associated with the R,G,B color channels is preferably related to an image capture device, notably the image capture device used for this capture. If this image conversion device is part of an electronic device such as a TV set, a set-top-box, a cell phone, a tablet, or a gateway, the image may be provided by the image receiver integrated in them. In such a situation, the linear RGB color space associated with the R,G,B color channels is preferably related to the image display device associated with this electronic device or with its image receiver.

If necessary, the gamma correction is first removed in a manner known per se from the saturated image (we assume for instance a 2.2 gamma) such as to obtain an image with color data expressed in the linear RGB color space of a display device. This display device could be any kind of actual or virtual device, as a LCD, an OLED display, a projector, or any device complying with a standard as, for instance, ITU 709. To each color of a pixel of the image, correspond three color values that represent the color coordinates of this color in the linear RGB space. Each color value is related to a color channel, R, G or B.

We will now describe a first non-limiting embodiment of the invention, where the image is segmented into segments of color saturated adjacent pixels which all belong to a same line of pixels. An advantage of this embodiment is that the image can be processed line after line, requiring then lower computational resources.

Figure 2:
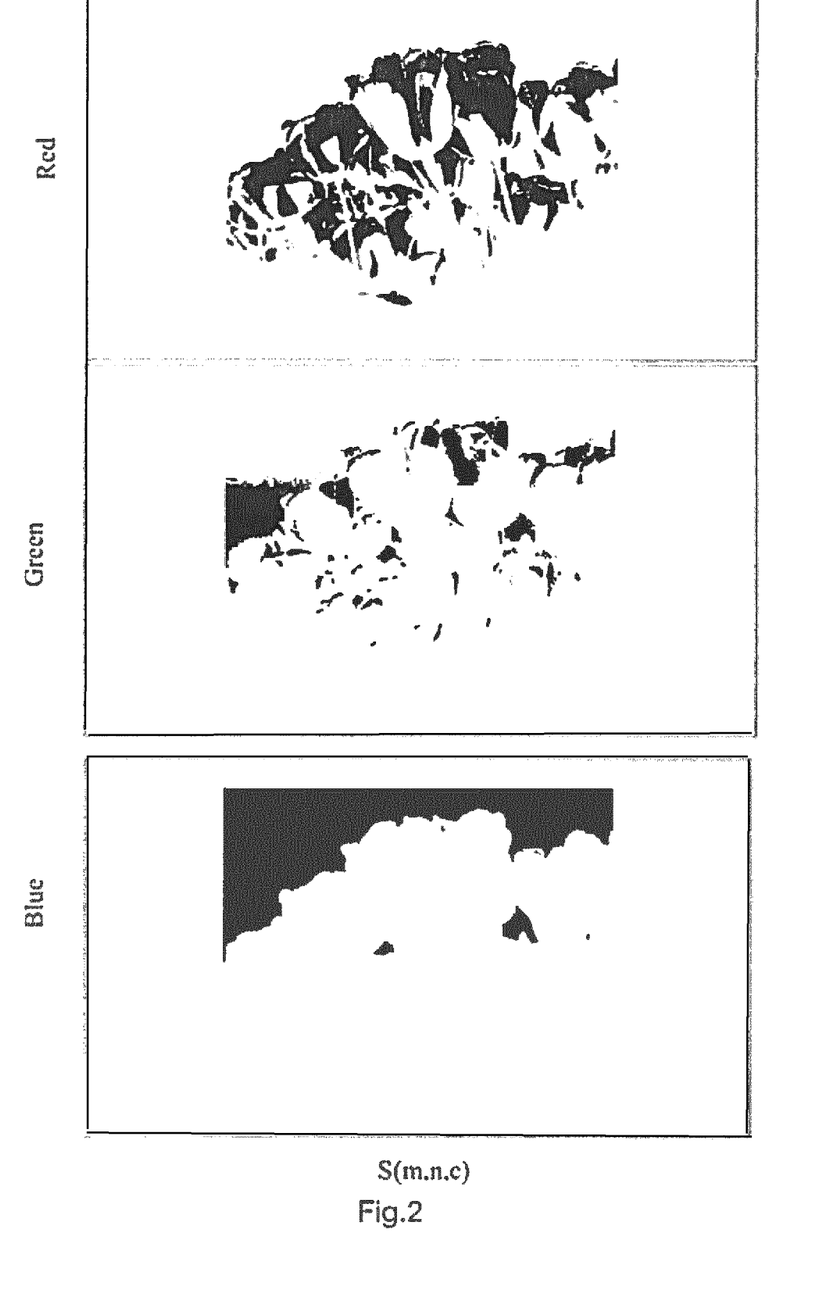
FIG. 2 illustrates, for each color channel Red, Green and Blue, the mask S which is obtained after the first step of the embodiment of FIG. 1.

In the first step of this first embodiment, a saturation mask S is constructed for each color channel of the image in a manner known per se in order to mark over-exposed areas of the image, more precisely to mark each pixel of this image having at least one color value which is saturated in at least one of the three color channels. These masks are illustrated on FIG. 2. For each color channel, the saturation mask S is for instance calculated through the following equation 1 using a saturation color value t which may be common to all color channels, or specific to each color channel:

$$S_m(n, c) = \begin{cases} 0 & I_m(n, c) > t \\ 1 & \text{otherwise} \end{cases} \quad (1)$$

where $I_m(n, c)$ is the value of a color in the color channel c for a pixel belonging to a line m of the image and to a column n of the image, where m belongs to the interval [1; M] and indicates a line, where n belongs to the interval [1; N] and indicates a column, and where c belongs to the group of color channels R, G, and B and indicates the color channel. For a 8-bit RGB image, the threshold t is for instance common to all color channel and set to 235 (instead of $2^8$) to account for noise.

According to the above definition of the value assigned to each pixel of a saturation mask S of a color channel c:

the value 0 for a pixel at position m,n means that the value of the color channel c associated with this pixel is saturated and that a color information related to this color channel needs to be reconstructed for this pixel;

the value 1 for this pixel means that the value of the color channel c associated with this pixel is not saturated and that no color information needs to be reconstructed.

In the second step of this first embodiment, the lines of adjacent pixels of the image are segmented into segments of adjacent pixels for which the corresponding values of the mask are 0. All pixels of any of those segments are clipped, i.e. have colors with at least one color channel being saturated.

In an ideal scenario, both the segmentation into segments of adjacent saturated pixels and the computation as described of a reconstructed non-saturated color information for each saturated pixel (see fourth step below) would be performed on the whole image. However, in most hardware-based applications, notably when the image processing device is integrated into an electronic consumer device, processing a saturated image as a whole would be computationally impractical. To resolve this, it is preferred, as described below, to process separately the different lines in which at least one segment of adjacent saturated pixels has been identified, i.e. one line after the other. Such an iterative process advantageously requires only access to the color values of the line to process, plus, as explained below, the preceding and following α lines, i.e. all lines in the interval [m−α,m+α]. When having low computational resources, α may be set to 0 or 1, while larger values are preferred to increase the robustness of the method. Of course, lines of pixels of the image are generally horizontal and, then, columns are vertical. But lines of pixels may also be vertical and, then columns are horizontal.

More details will now be given about one way to segment lines of pixels of the saturated image into segments of adjacent color saturated pixels using the saturation masks built in the first step above. Without departing from the invention, other ways of segmentation of lines into saturated segments can be used to implement the invention, as for instance those that do not require a mask.

In this first embodiment, to avoid introducing discontinuities and to ensure that similar clipped regions of the image are treated in a consistent way, in each line of the image, clipped pixels are grouped into segments based on their hue values and the pixels of each group (i.e. segment) are assigned a same pixel label as described below.

The hue $H_m(n)$ for a pixel belonging to a line m and to a column n is defined in a usual way in the CIELab color space as $H_m(n)=\arctan(b_m(n); a_m(n))$, where a and b are the CIELab chromatic components in the Lab color space corresponding to the above color values in the RGB color space of this pixel. The segmentation process of a line m of pixels of the image is then performed such that clipped and adjacent pixels with hue values $H_m(n)$ closer than a given threshold $t_c$ (for instance, $t_c=30°$) are considered as part of a same segment of this line and are therefore assigned a same label $s_{m,i}$. Therefore, the label $s_{m,i}$ of a pixel belonging to a line m and to a column n can be defined according to equation 2 as follows:

$$S_{m,i} \text{ if } \Delta H(m,n)<t_c \text{ and } S_m(n,c)=1$$

$$S_{m,(i+1)} \text{ if } \Delta H(m,n)\geq t_c \text{ and } S_m(n,c)=1$$

$$0 \text{ otherwise}$$

where i belongs to the interval $[1,L_m]$, $L_m$ being the number of clipped segments in line m,
where the function $\Delta_H(m,n)$ for a pixel position m,n is defined in equation 3:

$$\Delta H(m,n)=\min(|H_m(n)-H_m(n+1)|, 360-|H_m(n)-H_m(n+1)|) \quad \text{eq. (3)}$$

where $H_m(n)$ is the hue of this pixel, as defined above.

Figure 3:
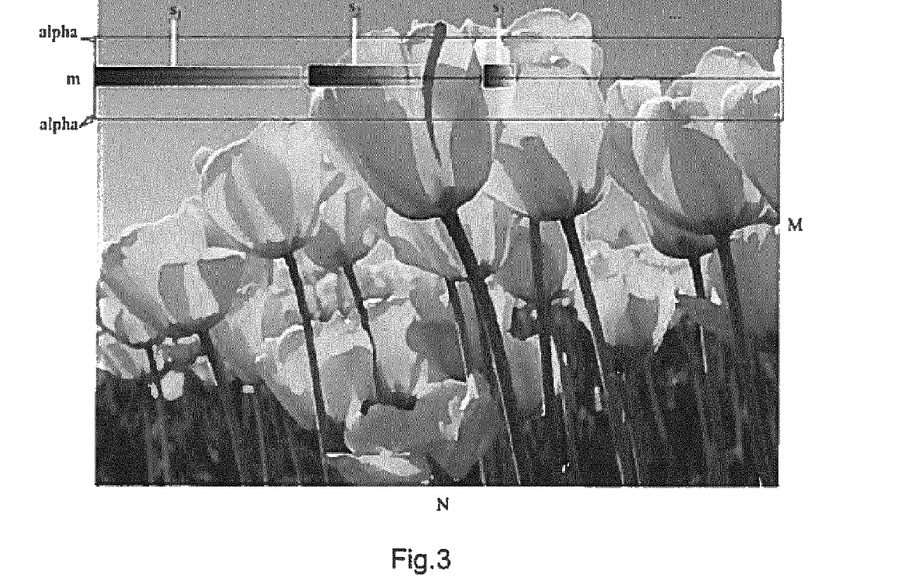
FIG. 3 illustrates the segmentation of a line of the saturated image into different segments $s_1, s_2, s_3, \ldots$ of color saturated pixel grouped based on their hue values after the second step of the embodiment of FIG. 1.
Figure 4:
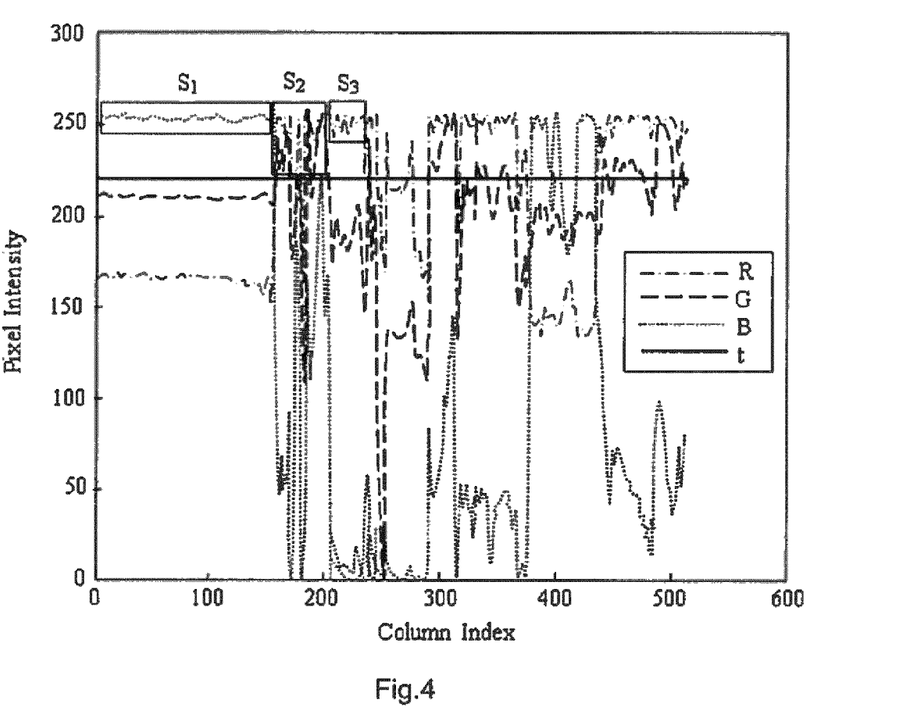
FIG. 4 illustrates the variation of the color information provided by the three color channels R, G, B over all pixels of the same line as shown on FIG. 3, where the same saturated segments $s_1, s_2, s_3, \ldots$ are identified by the saturation of the color information provided by at least one of the three color channels R, G and B.

At the end of this segmentation step of a line m comprising color saturated pixels, as illustrated on FIGS. 3 and 4, there are $L_m$ segments $s_1, s_2, s_3, \ldots, s_{Lm}$ of color saturated pixels in this line, the color values of them need to be reconstructed for a same at least one color channel. On FIG. 4, the color channel of the RGB color space that is saturated can be identity in each segment $s_1, s_2, s_3, \ldots$. The grouping process of clipped pixels with similar hue values in each line of the image is optional but preferred, because it ensures that pixels of similar hues will be treated similarly, and therefore will likely obtain a more coherent appearance after reconstruction of color information for desaturation.

In a third step of the first embodiment, for each $s_i$ of the saturated segments $s_1, s_2, \ldots, s_i, \ldots, s_{Lm}$ of the line m, at least one color channel that is not saturated is selected among the different color channels providing color information for the pixels of this segment. This selected color channel is named reference color channel $c_{ref}$ because it will be used as described below for the reconstruction of color information for the pixels of this segment. This reference channel $c_{ref}$ is selected among the unclipped color channels of a segment, according to a rule defined in table 1 below, based on the identification of the saturated color channel of this segment, using for instance the color information provided by the different channels as shown on FIG. 4.

TABLE 1

| Nb | Saturated color channel(s) | Reference color channel(s) |
|---|---|---|
| 1 | Red | Green |
| 2 | Green | Blue and/or Red |
| 3 | Blue | Green |
| 4 | Red and Green | Blue |
| 5 | Red and Blue | Green |
| 6 | Blue and Green | Red |
| 7 | Red, Blue and Green | Luminance expansion (see below) |

According to this rule, if only one color channel is clipped in a segment (cases 1, 2 and 3 in table 1), one of the unclipped color channels is chosen as the reference color channel for the desaturation correction. When possible, the green channel is preferably favoured in the choice, as this channel was found to be a better predictor for the remaining channels. This stems from its high correlation with image luminance due to the color filter array typically used in cameras. In cases where two color channels are saturated (cases 4, 5 and 6 in table 1), the only unclipped color channel is selected as the reference color channel to be used for the desaturation correction. Finally, if all color channels are saturated in the segment, a simple luminance expansion is applied in accordance to the corrections applied to the rest of the image (see below).

In a fourth step of the first embodiment, in each saturated segment of a line as defined above, the color value of each pixel that is related to the saturated color channel identified for this segment is replaced by a reconstructed non-saturated color value that is computed by using at least the color value of the same pixel that is related to the reference color channel of this segment as selected in the third step above.

In this step, the saturated channels of pixels of each detected segment are desaturated according to the information given by the reference color channel $c_{ref}$ selected for this segment.

The color correction for the desaturation of the pixels of a segment $s_i$ of a line m having one or two saturated color channels will now be described for one of these saturated color channel(s) of this segment. For this correction, some color information provided by the reference color channel $c_{ref}$ of this segment will be transferred to the saturated color channel of this segment as described below. To achieve this correction without introducing inconsistencies between similar regions of the image (e.g. multiple highlights on the same object), a hue consistency constraint is used in addition to the hue-based segmentation into segments of pixels of the second step above. This type of hue constraint is optional but preferred.

The hypothesis is that variations of color values related to the reference color channel $c_{ref}$ of a segment $s_i$ can be used to reconstruct missing color information in another color channel for pixels within this segment $s_i$. However, color values cannot be directly transferred from a reference color channel to a saturated color channel, as the saturated channel along this segment and the non-saturated channel along the same segment do not provide the same levels of values. One is higher than the other. Therefore, as described below, a scaling operation is preferably performed for this transfer.

Figure 5:
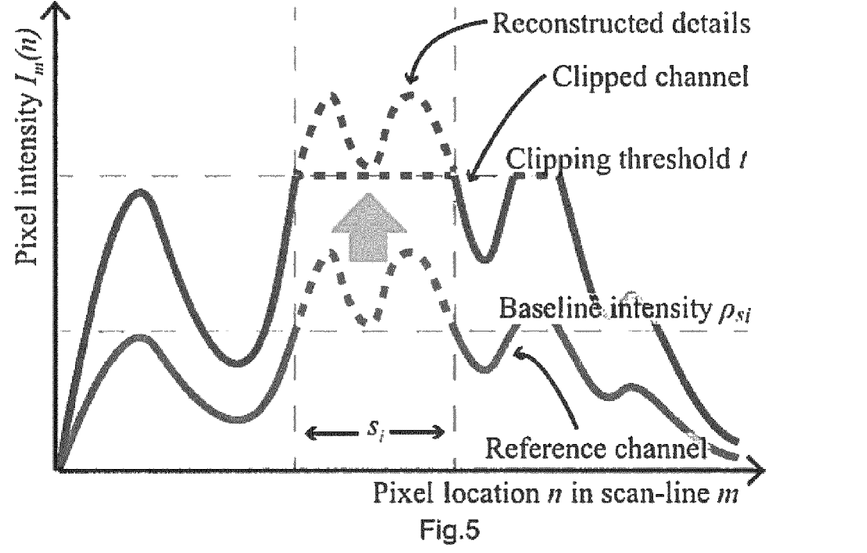
FIG. 5 illustrates, in a segment of FIGS. 3 and 4, how the difference between the color value provided by the reference color channel for a pixel of this segment and a baseline color value $\rho_{si}$ computed for this segment is added to the color value of this pixel that is provided by the saturated color channel of this segment, according to the fourth step of the embodiment of FIG. 1.

To solve this scaling issue, a baseline color value $\rho_{si}$ related to the reference color channel $c_{ref}$ of the segment $s_i$ to be desaturated is computed. Such a computation is detailed below. Then, the transfer is performed as illustrated in FIG. 5, i.e. for each pixel of this segment $s_i$, the difference between the color value of the reference color channel $c_{ref}$ for this pixel and the baseline color value $\rho_{si}$ computed for this segment is added to the color value of the saturated color channel for the same pixel.

To compute the baseline color value used for the scaling and related to the reference color channel $c_{ref}$ of a saturated segment $s_i$ of a line m, a representative average hue $H_{si}$ of this segment $s_i$ is first calculated in the CIELab color space for all pixels of this segment $s_i$. Then, the difference $\Delta H(k,n)$ between this average hue $H_{si}$ of this segment $s_i$ and the average of hues $H_k(n)$ of pixels at positions k,n, where $k\in\{m-\alpha, M+\alpha\}$, i.e. in the line m as well as in the $\alpha$ preceding and following lines is computed in a similar way as in equation 3 above. Then, the baseline color value $\rho_{si}$ is then computed according to the following equation 4:

$$\rho_{si}=\min_{k\in\{m-\alpha,m+\alpha\}}(I_k(n,c_{ref}))\forall k|\Delta H(k,n)|<t_{hue} \quad \text{(Eq. 4)}$$

where k∈{m−α, m+α}, where preferably, $t_{hue}$ equal approximately 20°.

It means that, when α=0, the baseline color value $\rho_{si}$ is computed as the minimum color value provided by the reference color channel $c_{ref}$ over all pixels in the segment $s_i$ whose hue is close enough to $H_{si}$ according to a criteria based on a proximity parameter $t_{hue}$ defined by |ΔH(m, n)|<$t_{hue}$.

It means that, when α>0, the baseline color value $\rho_{si}$ is computed as the minimum color value provided by the reference color channel $c_{ref}$ over all pixels in the segment $s_i$ of the line m, and over pixels adjacent to this segment in the in the neighbouring lines k, where k∈{m−α, m+α}, whose hues are close enough to $H_{si}$ according to a criteria based on a proximity parameter $t_{hue}$ defined by ∀k|ΔH(k, n)|<$t_{hue}$.

The above color correction for the desaturation of the color values of a saturated color channel for all pixels of a segment of a line of the image is then repeated for another color channel, if any. In segments where all three color channels are clipped, color values of the pixels of these segments are expanded according to corrected adjacent color values of pixels on the same line in order to obtain the local maximum color value. This ensures that fully clipped pixels are consistent with the corrections applied to one or two color channels of the other clipped segments of the same line.

Figure 6:
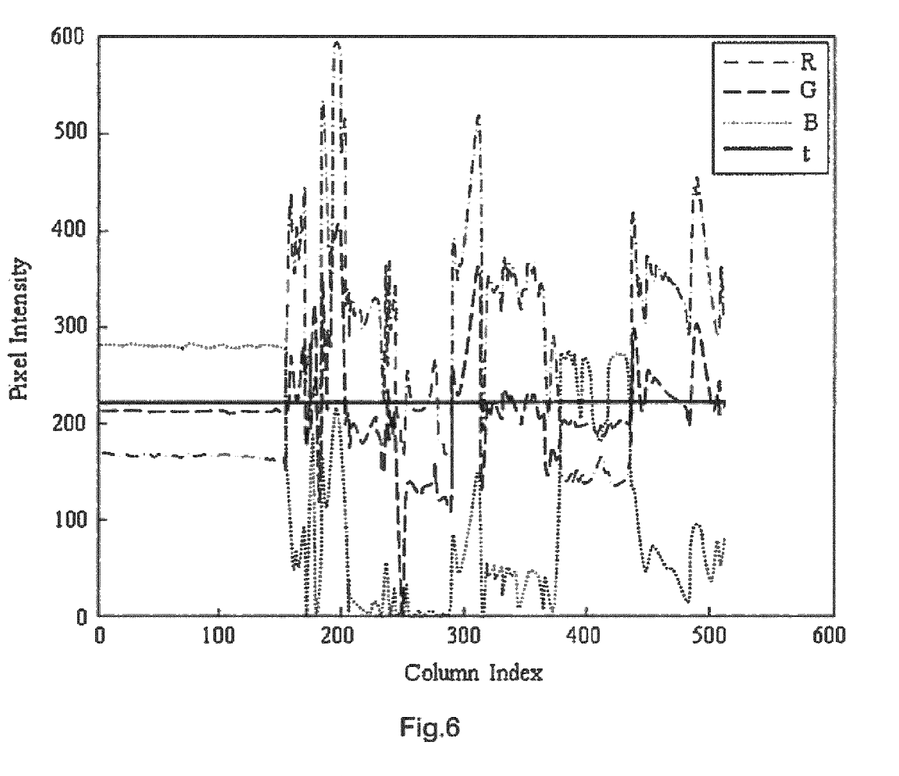
FIG. 6 illustrates the variation of the color information provided by the three color channels R, G, B over all pixels of the same line as shown on FIG. 3, resulting from the desaturation of all color channels as illustrated on FIG. 5, at the end of the fourth step of the embodiment of FIG. 1.

The above color correction process is then reiterated for each segment of this line. The variation of color information provided by the three color channels R, G, B over all pixels of this line that is then obtained is illustrated on FIG. 6.

Then, the process described above for a line of pixels is reiterated for all lines of the image comprising pixels with saturated colors.

After all pixels of the image are desaturated, a desaturated image I' is obtained, which is then gamma corrected in a reverse manner compared to the above beginning of the process.

Optionally, to still improve the robustness of the method as described above, the image is processed both horizontally and vertically. It means that, after a first processing as described above, the lines of the saturated image becomes the columns, and the columns of this saturated image becomes the lines, and the desaturation process is then repeated a second time on this saturated image, providing a second desaturated image. The final image is computed by taking, over the two desaturated images, the maximum color value in each color channel for each pixel. To avoid creating discontinuities near saturation boundaries, the corrected image is preferably alpha-blended with the uncorrected input using a simple ramp for input pixel values in the interval [t; 255].

Instead of relying on complex image analysis, the method according to this first embodiment employs simple statistics computed from a small set of lines of pixels of the image to enforce hue consistency between recovered regions. By considering hue information throughout the correction, the method produces natural results. Both the segmentation and the correction step of the method operate on a small number of lines of pixels, making this method well-suited for real-time, hardware applications, such as correcting images on the display side before expanding the dynamic range. Despite the computational simplicity, this method out-performs existing partial saturation correction solutions according to several image quality and color difference metrics.

Figure 1:
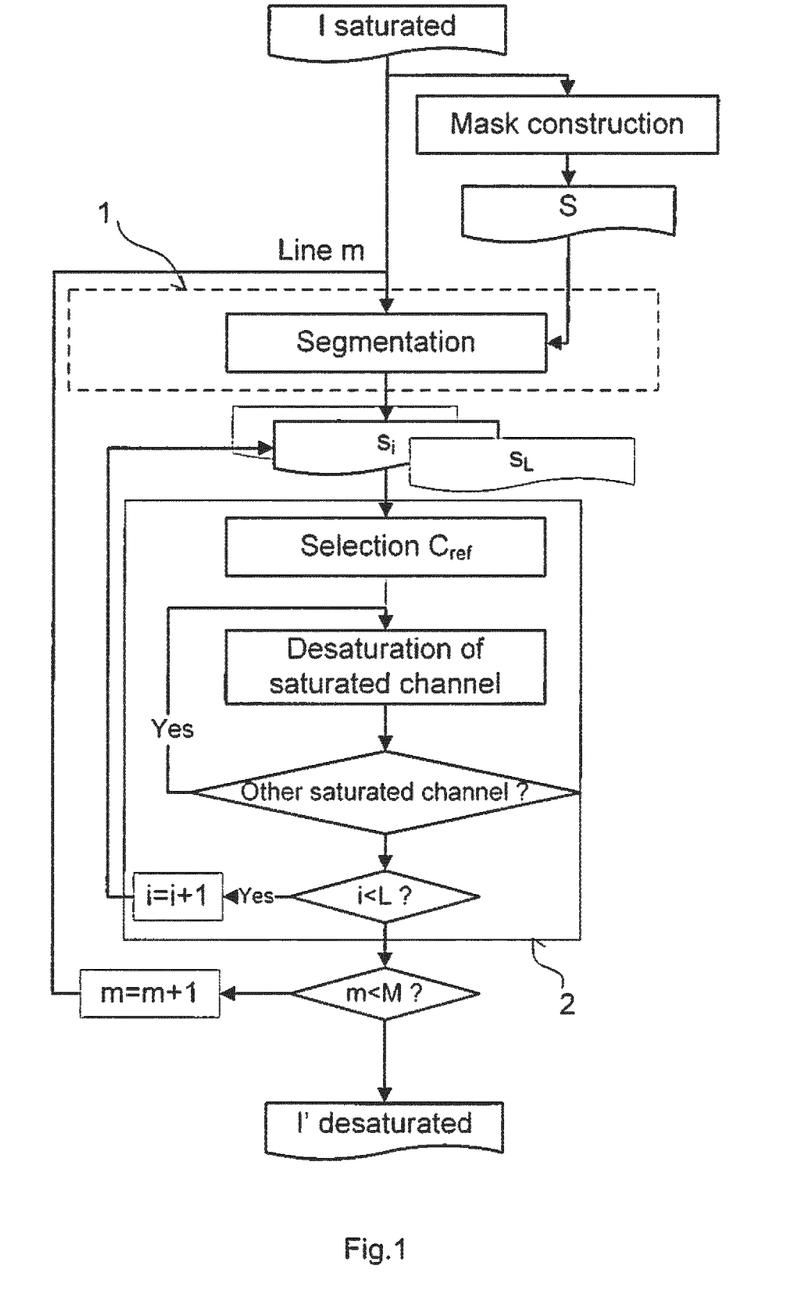
FIG. 1 is a flow chart illustrating a first embodiment of the method according to the invention.

In reference to FIG. 1, the image conversion device used to implement this first embodiment comprises notably:

a first module 1 configured to segment each line of pixels of an image having at least one pixel with saturated color into at least one segment of adjacent pixels the colors of which have at least one color channel in a linear RGB color space which is saturated, and, a second module 2 configured to desaturate pixels of each saturated segment of a line provided by the first module 1, by selecting at least one color channel $c_{ref}$ that is not saturated over said segment among the different color channels providing color information in said linear RGB color space for the pixels of said segment, and by replacing the color information of each of those pixels that is provided by the at least one saturated color channel of said segment by a reconstructed non-saturated color information computed by using at least the color information provided by the selected at least one non-saturated color channel $c_{ref}$ of said pixel.

Figure 7:
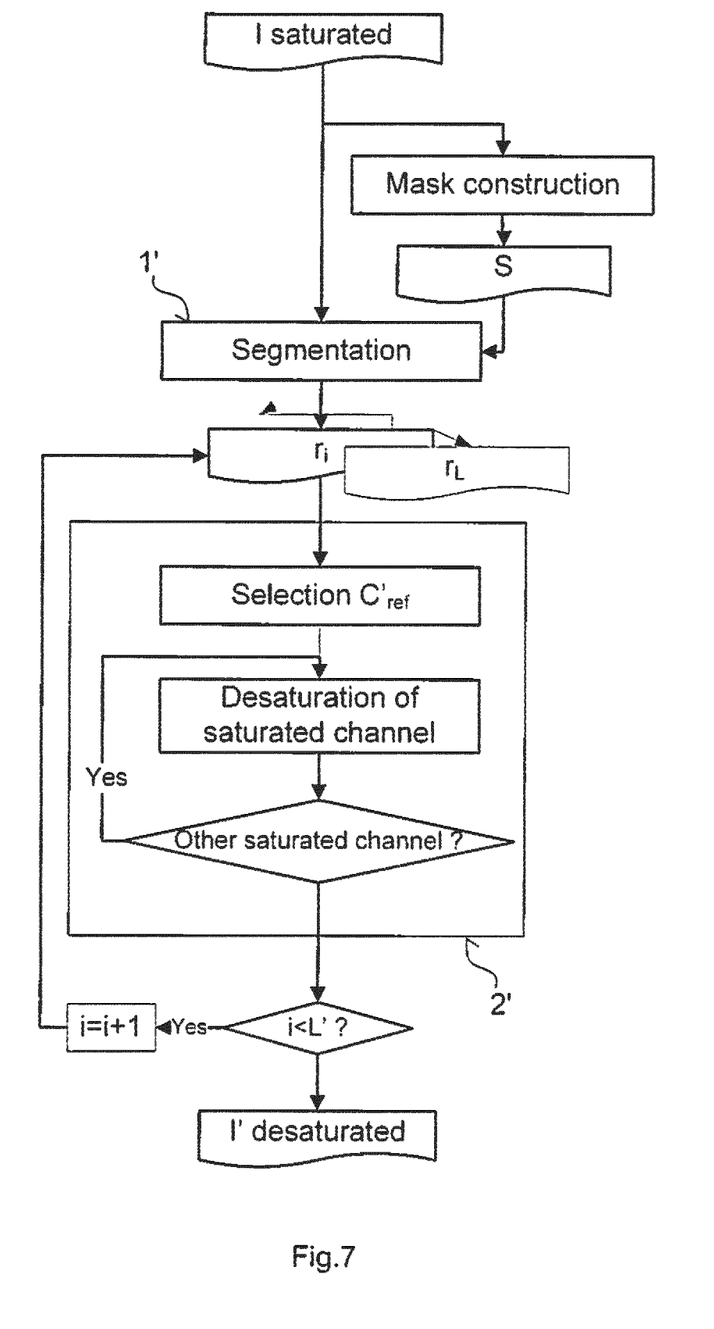
FIG. 7 is a flow chart illustrating a second embodiment of the method according to the invention.

We will now describe in reference to FIG. 7 a second non-limiting embodiment of the invention, where the image is segmented into regions of color saturated adjacent pixels, where pixels of a given saturated region are generally distributed over several lines of pixels.

In the first step of this second embodiment, a saturation mask S is constructed as in the first embodiment above for each color channel of the image in a manner known per se in order to mark over-exposed areas of the image, more precisely to mark each pixel of this image having at least one color value which is saturated in at least one of the three color channels. These masks are again illustrated on FIG. 2.

In the second step of this second embodiment, the image is segmented into regions of color-saturated pixels.

To perform this second step, the image is initially segmented into labelled regions of adjacent pixels by detecting connecting color components within the saturation mask. To do that, pixels that are assigned to a zero value in the saturation mask of step 1 are given a same segmentation label (i.e. be part of the same region) if they are neighbors. Two pixels are considered as neighbor when the spatial pixel distance between these pixels is less or equal to a spatial distance neighbor threshold. This is considered as neighbor criteria. The spatial distance neighbor threshold is generally comprised between 4 and 8 pixels. Pixels that are assigned to a zero value in the saturation mask of step 1 are given different segmentation labels if they do not fit the neighbor criteria, will therefore be considered as belonging to different initial regions.

The above initial segmentation of the image is then refined based on color similarity and distance between labelled regions as follows:
1. Colors of pixels of the image are converted in a manner known per se from the RGB color space to the CIE Lab color space.
2. For each labelled region r∈R we compute an average color value using $$Lab_r = \frac{1}{|r|}\Sigma_{i \in r} Lab(i),$$

where |r| indicates the number of pixels within this region r.
3. For each labelled region r, we compute a color difference between r and every other labelled region ρ using
$\Delta E_r(\rho) = \sqrt{(Lab_r - Lab_\rho)^2}$ 4. For each labelled region r, we additionally compute its spatial distance $D_r(\rho)$ to each other labelled region $\rho$ using the following:
   a. $\Delta M_r(\rho) = \min|M_r - M_\rho|$ where M indicates the vertical coordinates of each region in the image,
   b. $\Delta N_r(\rho) = \min|N_r - N_\rho|$ where N indicates the horizontal coordinates of each region in the image,
   c. $D_r(\rho) = \sqrt{(\Delta M_r(\rho))^2 + (\Delta N_r(\rho))^2}$
5. Finally we merge labelled regions which have a color difference $\Delta E_r(\rho)$ to each other labelled region $\rho$ less than a color distance merging threshold, and a spatial distance $D_r(\rho)$ to each other labelled region $\rho$ of less than spatial distance merging threshold.

The color distance merging threshold is for instance equal to 10, and the spatial distance merging threshold is for instance equal to 1% of the largest dimension of the image.

At the end of this step, we obtain a final segmentation of the image into color saturated regions.

In a third step of this second embodiment, for each of the saturated regions $r_1, r_2, \ldots, r_i, \ldots, r_L$, at least one color channel that is not saturated is selected among the different color channels providing color information for the pixels of this saturated region. This selected color channel is named reference color channel $c'_{ref,ri}$ and will be used as described below in step 4 for the reconstruction of color information for the pixels of this region $r_i$. A specific reference channel $c'_{ref,ri}$ is selected for each region $r_i$ as described in the third step of the first embodiment.

The fourth step of this second embodiment is similar to the fourth step of the first embodiment, if the term "segment" is replaced by "region".

In each saturated region as defined above in the segmentation step 2, the saturated color channel(s) of pixels are desaturated. More precisely, the color value of each pixel of this region that is related to the saturated color channel identified for this region is replaced, as in step 4 of the first embodiment, by a reconstructed non-saturated color value.

A baseline color value $\rho'_{ri}$ related to the reference color channel $c'_{ref,ri}$ of the region $r_i$ to be desaturated is computed for each saturated region $r_i$. This baseline color value $\rho'_{ri}$ is for instance taken as the minimum color value provided by the reference channel $c'_{ref,ri}$ over all pixels in this saturated region $r_i$, and is computed according to the following equation:

$$\rho'_{ri} = \min_{k \in r_i} (I(k, C_{ref,ri})),$$

where k indicates a pixel location within the region $r_i$.

Then, for each pixel of a saturated region $r_i$, the reconstructed non-saturated color value of this pixel is obtained by adding the color value of the saturated color channel for this pixel and the difference between the color value of the reference color channel $c_{ref,ri}$ for this pixel and the baseline color value $\rho'_{ri}$ computed for this region.

In this second embodiment, the computation of the baseline $\rho'_{ri}$ is done per saturated region. This improves consistency in the image as more pixels are involved for computing this baseline and as it allows advantageously the different saturated regions to follow the image structure more accurately.

The above color correction for the desaturation of the color values of a saturated color channel for all pixels of a saturated region of the image is then repeated for another color channel, if any.

The above color correction process is then reiterated for each saturated region of the image up to the last region $r_L$.

After all saturated regions of the image are desaturated, a desaturated image I' is obtained, which is then gamma corrected in a reverse manner compared to the beginning of the process.

In reference to FIG. 7, the image conversion device used to implement this second embodiment comprises notably:

a first module 1' configured to segment an image in regions of pixels the colors of which have at least one color channel in a linear RGB color space which is color saturated, and a second module 2' configured to desaturate pixels of each saturated region $(r_i)$ provided by the first module 1' by selecting at least one color channel $(c_{ref}; c'_{ref,ri})$ that is not saturated over said pixels of said region $(s_i; r_i)$ and, for each of those pixels, by replacing the color information of said pixel that is provided by the at least one saturated color channel of said region by the sum of the color information provided by said at least one saturated color channel of said region for said pixel and of the difference between the color information provided by the selected at least one non-saturated color channel $(c_{ref}; c'_{ref,ri})$ for said pixel and a baseline color value $(\rho_{si}; \rho'_{si})$ computed for the region $(s_i; r_i)$ of said pixel for each $(r_i)$ of these saturated regions.

It is to be understood that the image conversion device used to implement the first or the second embodiment, as any other embodiment as claimed below, may comprise various forms of hardware, software, firmware, special purpose processors, or combinations thereof. The invention may be notably implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a monitor display device to display the images before and after desaturation.

This image conversion device can be notably part of an electronic device such as a TV set, a cell phone, a tablet, a set-top-box, a gateway, or a camera.

As a conclusion, the method of conversion of a saturated image into a de-saturated image that has been described takes advantage of the spatial RGB channel correlation present in natural images. Instead of relying on complex image analysis, the method according to the invention employs simple statistics computed from a small set of pixels of the image.

While the present invention is described above with respect to a particular embodiment, it is understood that the present invention is not limited to this embodiment. The present invention as claimed below therefore includes variations from this embodiment described herein, as will be apparent to one of skill in the art.

The invention claimed is:

1. A method of conversion of a saturated image into a non-saturated image comprising:
   segmenting said saturated image in regions of pixels the colors of which have at least one color channel in a linear RGB color space which is saturated, and, for each of these saturated regions ($s_i$; $r_i$), wherein i is a positive integer,
   among the different color channels providing color information in said linear RGB color space for the pixels of said region ($s_i$; $r_i$) selecting at least one color channel ($c_{ref}$, $c'_{ref,ri}$) that is not saturated over pixels of said region ($s_i$; $r_i$),
   for each pixel of said region, replacing the color information of said pixel that is provided by the at least one saturated color channel of said region ($s_1$; $r_i$) by a reconstructed non-saturated color information,
   wherein said reconstructed non-saturated color information is a sum of the color information provided by said at least one saturated color channel of said region for said pixel and of a difference between the color information provided by the selected at least one non-saturated color channel ($c_{ref}$, $c'_{ref,ri}$) for said pixel and a baseline color value ($\rho_{si}$; $\rho'_{si}$) computed for the region ($s_i$; $r_i$) of said pixel, thus providing said converted non-saturated image.

2. The method of conversion according to claim 1 wherein said baseline color value ($\rho_{si}$; $\rho'_{si}$) of a region ($s_i$; $r_i$) is computed as the minimum color value provided by the selected at least one non-saturated color channel ($c_{ref}$, $c'_{ref,ri}$) of this region over at least all pixels in this region.

3. The method of conversion according to claim 1 wherein said image is divided into lines of pixels, wherein said segmenting is performed line by line, one line with saturated pixels after the other, and wherein said regions are segments of lines.

4. An image conversion device for the conversion of a saturated image into a de-saturated image, comprising:
   a memory; and
   a processor, said processor being configured to process a program stored on said memory to segment an image in regions of pixels, colors of the pixels having at least one color channel in a linear RGB color space which is color saturated, and
   to desaturate pixels of each saturated region ($s_i$; $r_i$), wherein i is a positive integer, by selecting at least one color channel ($c_{ref}$, $c'_{ref,ri}$) that is not saturated over said pixels of said region ($s_i$; $r_i$) and, for each pixel, by replacing color information of said pixel provided by at least one saturated color channel of said region by a sum of color information provided by said at least one saturated color channel of said region for said pixel and of a difference between color information provided by the selected at least one non-saturated color channel ($c_{ref}$, $c'_{ref,ri}$) for said pixel and a baseline color value ($\rho_{si}$; $\rho'_{si}$) computed for the region ($s_i$; $r_i$) of said pixel.

5. The image conversion device according to claim 4 wherein said processor is further configured to segment each line of said image in regions that are segments of said line.

6. An electronic device comprising an image conversion device according to claim 4.

7. The electronic device according to claim 6 wherein said electronic device is a TV set, a cell phone, a tablet, a set-top-box, a gateway, or a camera.

* * * * *